(12) United States Patent
Nakata et al.

(10) Patent No.: US 10,661,176 B2
(45) Date of Patent: May 26, 2020

(54) INFORMATION PROCESSING SYSTEM AND INFORMATION PROCESSING METHOD

(71) Applicant: Sony Interactive Entertainment Inc., Tokyo (JP)

(72) Inventors: Masashi Nakata, Kanagawa (JP); Takashi Imamura, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 50 days.

(21) Appl. No.: 16/150,071

(22) Filed: Oct. 2, 2018

(65) Prior Publication Data

US 2019/0111338 A1    Apr. 18, 2019

(30) Foreign Application Priority Data

Oct. 17, 2017    (JP) .................................. 2017-201228

(51) Int. Cl.

| | |
|---|---|
| A63F 13/65 | (2014.01) |
| A63F 13/25 | (2014.01) |
| G06K 9/00 | (2006.01) |
| G06K 9/20 | (2006.01) |
| A63F 13/213 | (2014.01) |
| A63F 13/69 | (2014.01) |
| A63F 13/35 | (2014.01) |
| A63F 13/57 | (2014.01) |

(52) U.S. Cl.
CPC ............ *A63F 13/65* (2014.09); *A63F 13/213* (2014.09); *A63F 13/25* (2014.09); *A63F 13/35* (2014.09); *A63F 13/57* (2014.09); *A63F 13/69* (2014.09); *G06K 9/00335* (2013.01); *G06K 9/00369* (2013.01); *G06K 9/2018* (2013.01); *A63F 2300/1093* (2013.01); *A63F 2300/66* (2013.01); *A63F 2300/69* (2013.01); *A63F 2300/8082* (2013.01)

(58) Field of Classification Search
None
See application file for complete search history.

(56) References Cited

U.S. PATENT DOCUMENTS

| | | | |
|---|---|---|---|
| 2011/0163163 A1* | 7/2011 | Rowe ................. | G06K 9/00046 235/462.25 |
| 2014/0002493 A1* | 1/2014 | Mitchell ................. | G06T 13/20 345/633 |
| 2016/0129335 A1* | 5/2016 | Domansky ......... | G06K 9/00348 348/77 |
| 2016/0210754 A1* | 7/2016 | Ida .......................... | G06T 7/586 |

FOREIGN PATENT DOCUMENTS

JP    2013-108788 A    6/2013

* cited by examiner

*Primary Examiner* — Jason T Yen
(74) *Attorney, Agent, or Firm* — Katten Muchin Rosenman LLP

(57) ABSTRACT

Disclosed herein is an information processing system including an imaging section, an identification section, a setup section, and a display control section. The imaging section captures an image of a user-designated body and outputs multispectral data regarding a subject. The multispectral data indicates light intensity in four or more wavelength bands. The identification section identifies the type of the subject in accordance with the multispectral data regarding the subject. The setup section sets, based on the type of the subject, an object corresponding to the subject appearing in a game. The display control section causes the object to be displayed in the game in a manner based on the type of the subject.

14 Claims, 9 Drawing Sheets

INFORMATION PROCESSING SYSTEM AND INFORMATION PROCESSING METHOD

BACKGROUND

The present disclosure relates to an information processing system and an information processing method that utilize multispectral data indicative of light intensity in four or more wavelength bands.

Multispectral data acquired by capturing an image of a body may be used to identify what the objet belongs to and examine the status of the body.

SUMMARY

The inventors of the present disclosure have found that utilizing multispectral data acquired by capturing an image of a body makes it possible to provide a novel experience for a user.

The present disclosure has been made based on the above idea of the inventors, it is desirable to provide a novel experience for a user by utilizing multispectral data acquired by capturing an image of a body.

According to an embodiment of the present disclosure, there is provided an information processing system including an imaging section, an identification section, a setup section, and a display control section. The imaging section captures an image of a user-designated body and outputs multispectral data regarding a subject that indicates light intensity in four or more wavelength bands. The identification section identifies the type of the subject in accordance with the multispectral data regarding the subject. The setup section sets, based on the type of the subject, an object corresponding to the subject appearing in a game. The display control section causes the object to be displayed in the game in a manner based on the type of the subject.

According to another embodiment of the present disclosure, there is provided another information processing system including an imaging section, an identification section, and an action section. The imaging section captures an image of a user-designated body and outputs multispectral data regarding a subject that indicates light intensity in four or more wavelength bands. The identification section identifies the type of the subject in accordance with the multispectral data regarding the subject. The action section executes a predetermined action with respect to the subject in accordance with the type of the subject that is identified by the identification section.

According to yet another embodiment of the present disclosure, there is provided yet another information processing system including an imaging section, an identification section, and a control section. The imaging section captures an image of a user-designated body and outputs multispectral data regarding a subject that indicates light intensity in four or more wavelength bands. The identification section identifies the type of the subject in accordance with the multispectral data regarding the subject. The control section varies the status of a predetermined device in contact with a user's body in accordance with the type of the subject that is identified by the identification section.

According to still another embodiment of the present disclosure, there is provided an information processing method for an information processing system including: capturing an image of a user-designated body and outputting multispectral data regarding a subject that indicates light intensity in four or more wavelength bands; identifying the type of the subject in accordance with the multispectral data regarding the subject; setting, based on the type of the subject, an object corresponding to the subject appearing in a game; and causing the object in the game to be displayed in a manner based on the type of the subject.

A combination of the above-mentioned elements and an expression of the present disclosure that are converted between, for example, systems, computer programs, recording media storing readable computer programs, and data structures are also effective as an embodiment of the present disclosure.

The embodiments of the present disclosure provide a novel experience for a user by utilizing multispectral data acquired by capturing an image of a body.

DETAILED DESCRIPTION OF THE PREFERRED EMBODIMENTS

First Embodiment

A first embodiment of the present disclosure proposes an information processing system (an entertainment system described below) that utilizes multispectral data acquired by capturing an image of a body in the real world in order to provide a user with novel entertainment formed of a combination of real world and game world.

Figure 1:
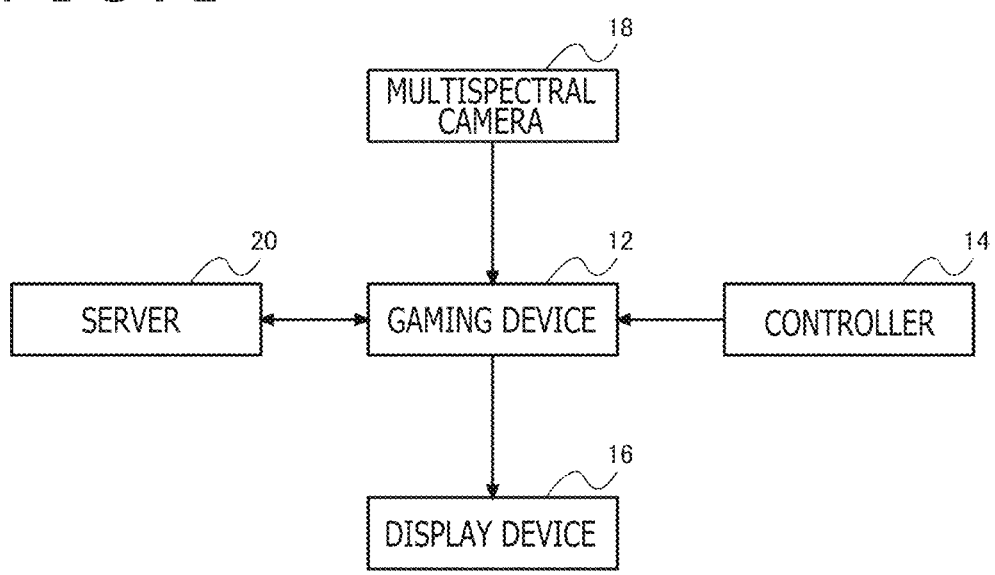
FIG. 1 is a diagram illustrating a configuration of an entertainment system according to a first embodiment of the present disclosure.

FIG. 1 illustrates a configuration an entertainment system 10 according to the first embodiment. The entertainment system 10 includes a gaming device 12, a controller 14, a display device 16, a multispectral camera 18, and a server 20. The gaming device 12, the controller 14, the display device 16, and the multispectral camera 18 may be owned by the user. The server 20 may be installed in the cloud. The devices depicted in FIG. 1 may be interconnected through a wired or wireless interface. The gaming device 12 and the server 20 may be connected, for example, through a local area network (LAN), a wide area network (WAN), or the Internet.

The gaming device 12 is an information processing device that generates game images by executing a gaming application. The gaming device 12 may be a stationary gaming device, a portable gaming device, or a smartphone, a tablet computer, or a personal computer (PC) on which a gaming application is installed.

The controller 14 is an operating device for the gaming device 12. The controller 14 receives user operations with respect to the gaming device 12 and transmits the received operations to the gaming device 12. The display device 16 uses a screen to display game images generated by the gaming device 12. The display device 16 may be a head-mounted display. In such an instance, the gaming device 12 may generate virtual reality images or augmented reality images as the game images.

A multispectrum in the present embodiment is a spectrum that is divided into four or more wavelength bands, and is referred to also as a hyperspectrum. The multispectral camera 18 acquires multispectral data, which is data regarding light incident from a subject (i.e., an imaging target body) and indicative of light intensity in four or more wavelength bands. The multispectral camera 18 may be a well-known multispectral camera.

The server 20 identifies the subject and its status in accordance with multispectral data regarding the subject, which is outputted from the multispectral camera 18. Based on the result of identification by the server 20, the gaming device 12 sets an object (a character or an item and hereinafter referred to as a game object) in a game that corresponds to the subject, and causes the game object to appear in a game space.

Figure 2:
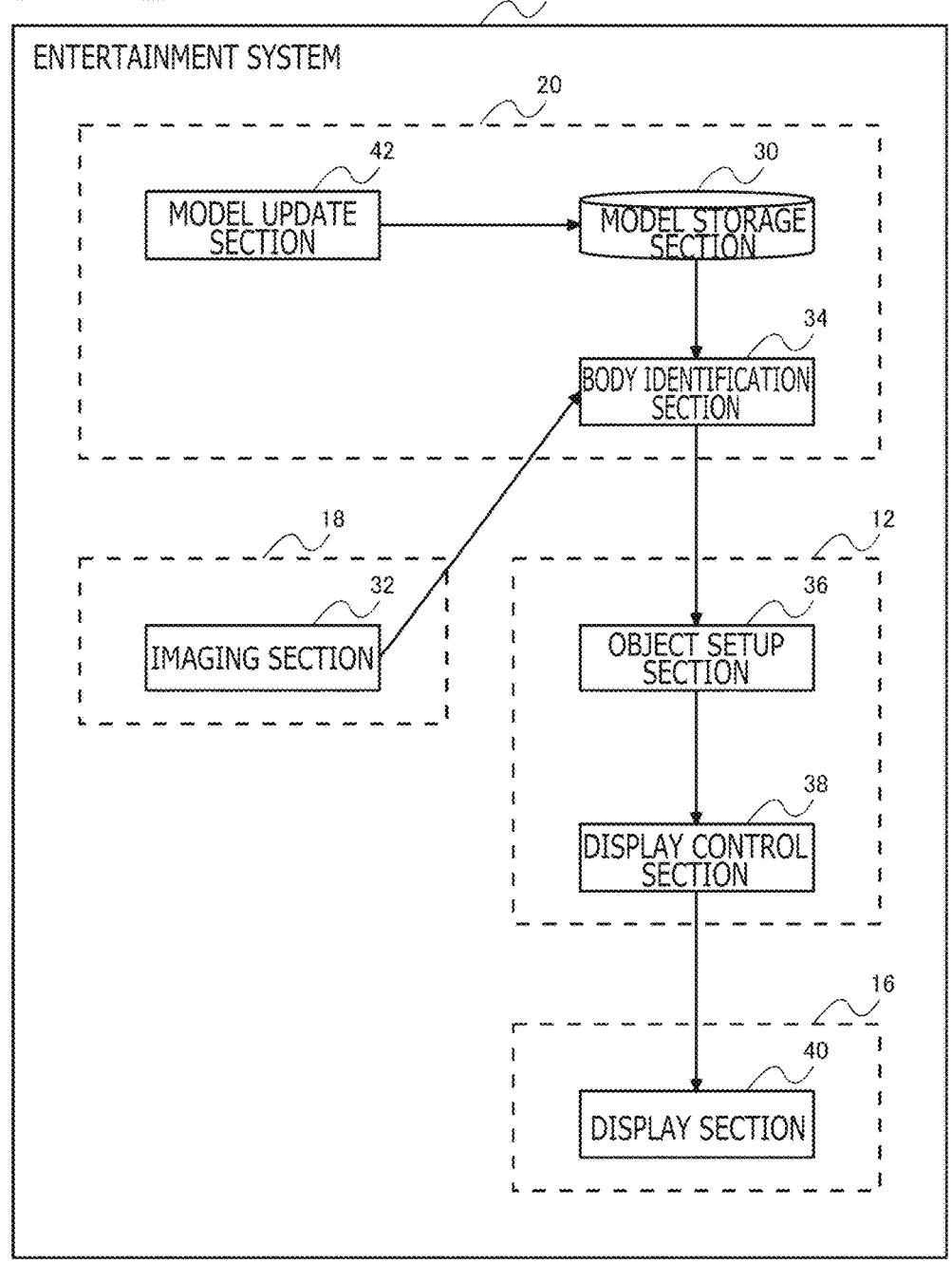
FIG. 2 is a block diagram illustrating a functional configuration of the entertainment system depicted in FIG. 1.

FIG. 2 is a block diagram illustrating a functional configuration of the entertainment system 10 depicted in FIG. 1. The entertainment system 10 includes a model storage section 30, an imaging section 32, a body identification section 34, an object setup section 36, a display control section 38, a display section 40, and a model update section 42.

Referring to FIG. 2, individual elements depicted as functional blocks that perform various processes may be formed of a circuit block, a memory, a large-scale integration (LSI), or other hardware, and implemented, for example, by allowing a central processing unit (CPU) to execute a program loaded into a memory. Therefore, it will be understood by those skilled in the art that the functional blocks may be variously implemented by hardware only, by software only, or by a combination of hardware and software. The method of implementing the functional blocks is not specifically limited.

The functional blocks of the entertainment system 10 depicted in FIG. 2 may be executed distributively or collaboratively by a plurality of devices depicted in FIG. 1. In the present embodiment, the server 20 provides the functions of the model storage section 30, body identification section 34, and model update section 42, and the multispectral camera 18 provides the functions of the imaging section 32. Further, the gaming device 12 (or the gaming application installed on the gaming device 12) provides the functions of the object setup section 36 and display control section 38. Furthermore, the display device 16 provides the functions of the display section 40.

The display section 40 uses a screen to display electronic content (e.g., game images) designated by the display control section 38. The display section 40 may be a head-mounted display and display virtual reality (VR) images or augmented reality (AR) images on the screen.

The model storage section 30 stores a plurality of pieces of multispectral data (hereinafter referred to as the model data) regarding each combination of predefined type and status of a body serving as a subject. The model data may be multispectral data regarding each of a plurality of bodies that is acquired beforehand by using the multispectral camera to capture images of a plurality of bodies having different combinations of type and status. The model storage section 30 may store data indicative of a plurality of combinations of the type and status of a body in association with a plurality of model data.

Information indicative of the type of body may indicate what the body is or belongs to. Information indicative of the status of body may include information indicating the attributes, characteristics, or properties of the body. The information indicative of the status of body may indicate the hotness, coldness, deterioration, or health of the body or indicate whether the body is living.

For example, a plurality of model data regarding one type of body (e.g., a beetle) may include multispectral data regarding its living state and multispectral data regarding its dead state. The former multispectral data may be acquired beforehand as the result of capturing an image of a living beetle. The latter multispectral data may be acquired beforehand as the result of capturing an image of a dead beetle. Further, a plurality of model data regarding another type of body (e.g., coffee in a cup) may include multispectral data regarding its hot state and multispectral data regarding its cold state.

The imaging section 32 captures an image of a user-designated body, detects light intensity in four or more wavelength bands in accordance with light incident from a subject, and outputs multispectral data regarding the subject that indicates the light intensity in the four or more wavelength bands. The four or more wavelength bands may include common red, green, and blue (RGB) wavelength bands and at least one wavelength band other than the R, G, and B wavelength bands. Further, the four or more wavelength bands need not always include one or more visible-light wavelength bands, and may include ultraviolet wavelength bands and infrared wavelength bands. Furthermore, at least some of the four or more wavelength bands to be detected by the imaging section 32 may be user-designated depending on the type and properties of the subject.

Two exemplary procedures for detecting a subject's multispectrum, namely, (1) a procedure for acquiring four or more wavelength bands with a camera pixel array and (2) a procedure for changing the type of light irradiated onto a subject (i.e., an imaging target space that may include the subject).

(1) Acquiring Four or More Wavelength Bands with a Camera Pixel Array

Figure 3:
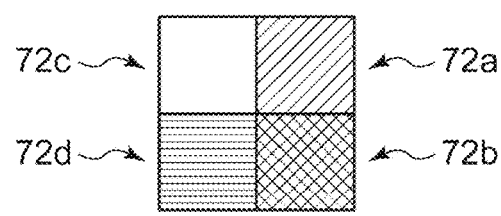
FIG. 3 is a schematic diagram illustrating an array of color filters in an imaging element included in an imaging section.

FIG. 3 schematically illustrates an array of color filters in an imaging element 70 included in the imaging section 32. The imaging element 70 may include a color filter 72a for transmitting light having a wavelength of 350 nm (nanometers), a color filter 72b for transmitting light having a wavelength of 450 nm, and a color filter 72c for transmitting light having a wavelength of 550 nm. The imaging element 70 may also include a color filter 72d for transmitting light having a wavelength of 700 nm. Organic photoelectric conversion films may be used instead of the color filters.

As indicated in FIG. 3, the multispectrum of a body can be detected when an imaging element section is provided with four or more different color filters. Four or more different color filters may be provided for a single imaging element. An alternative is to incorporate a plurality of imaging elements into the imaging section 32 (e.g., multispectral camera 18), allow an imaging element to detect a combination of three or fewer different wavelengths, and allow another imaging element to detect another combination of three or fewer different wavelengths. When the latter configuration is adopted, the whole imaging section 32 is able to detect a subject's multispectrum including four or more different wavelength bands.

(2) Changing the Type of Light Irradiated onto a Subject

An output obtained from the imaging section 32 is expressed by Equation 1 below:

$$\text{Output} = \text{spectrum of imaging section 32} \times \text{subject reflectance} \times \text{ambient light} \quad \text{(Equation 1)}$$

The subject is a body existing in a real space, for example, an insect. The ambient light is, for example, fluorescent lamp light in an indoor location or sunlight in an outdoor location. The spectrum of the imaging section 32 is a known value measured beforehand.

Figure 4:
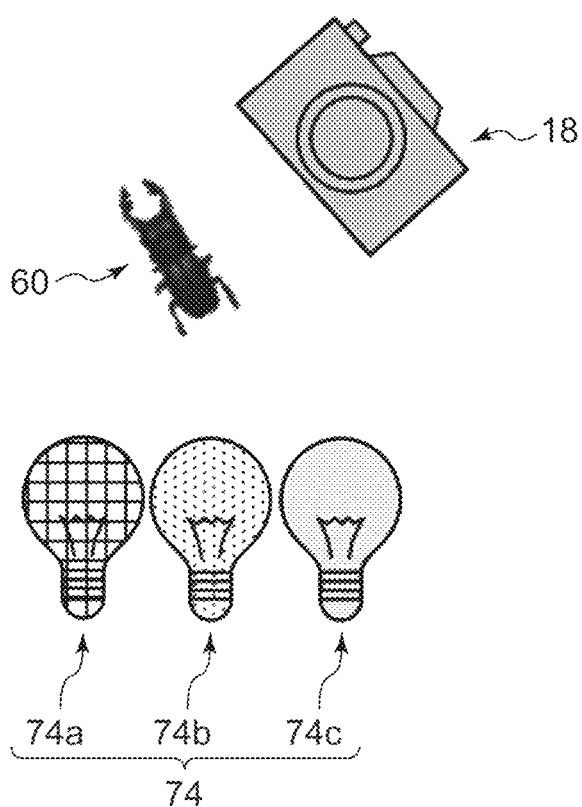
FIG. 4 is a schematic diagram illustrating a configuration for changing the type of light irradiated onto a subject.

FIG. 4 schematically illustrates a configuration for changing the type of light irradiated onto a subject. Referring to FIG. 4, the entertainment system 10 includes a light source 74a, a light source 74b, and a light source 74c (generically referred to as the light sources 74) that irradiate light having different wavelengths onto the subject (an insect 60 in the present example) that is to be imaged by the multispectral camera 18. The light sources 74 may be attached to the multispectral camera 18.

Equation 1 above indicates that the output of the imaging section 32 changes when the type of ambient (wavelength) changes. Thus, the entertainment system 10 may sequentially select one light source 74 from among a plurality of light sources 74 and allow the selected light source 74 to irradiate light. Stated differently, the entertainment system 10 may sequentially change the light source 74 for light irradiation and measure the output value of the imaging section 32 after each light source change. As a result, only the subject reflectance is an unknown term in Equation 1, and its value can be obtained. That is to say, the spectral characteristics of the subject, that is, the subject's multispectrum can be obtained.

Returning to FIG. 2, the body identification section 34 identifies both the type and status of the subject in accordance with the subject's multispectrum. More specifically, the body identification section 34 identifies the type and status of the subject depending on the difference between the subject's multispectral data outputted from the imaging section 32 and a plurality of model data stored in the model storage section 30. The body identification section 34 may identify the status of the subject by determining whether the subject is living or not.

If, for example, the multispectral data regarding the subject agrees with the model data regarding a living beetle and disagrees with the multispectral data regarding a dead beetle, the body identification section 34 may identify the type of subject as a "beetle" and identify the status of subject as a "living state (i.e., living body)." Agreement between the multispectral data and the model data includes a case where the degree of similarity between the two data is equal to or higher than a predetermined value, and disagreement between the multispectral data and the model data includes a case where the degree of similarity between the two data is smaller than the predetermined value. Further, the imaging section 32 may acquire multispectral data including light intensity in a wavelength peculiar to a living body (e.g., a predefined infrared wavelength band). If the light intensity in the above-mentioned wavelength band is equal to or higher than a predetermined threshold value, the body identification section 34 may identify the subject as a living body.

The imaging section 32 may output a plurality of subject images that are obtained by capturing an image of the same subject at successive time points. In such an instance, the plurality of subject images indicate the motion of the subject. Further, the imaging section 32 may output video data that indicates the motion of a user-designated subject in chronological order. Based on both the multispectral data regarding the subject and the presence of motion of the subject, which is indicated by the result of imaging by the imaging section 32, the body identification section 34 may identify whether the subject is living or not. For example, if the motion of the subject is detected in a situation where the multispectral data regarding the subject agrees with the multispectral data regarding a dead beetle, the body identification section 34 may identify the subject as a living body.

The display control section 38 displays an image of a game object corresponding to the subject in a game in a manner based on at least the type of the subject identified by the body identification section 34, as well as game images on the display section 40. The display control section 38 according to the present embodiment controls the content to be displayed on the display section in coordination with the object setup section 36. The object setup section 36 sets the status of the game object in the game in accordance with at least the status of the subject identified by the body identification section 34 (in accordance with both the type and status of the subject in the present embodiment).

For example, the object setup section 36 may set the appearance of the game object in accordance with the type of subject. Further, the object setup section 36 may set image data associated with the type of subject, which is among a plurality of types of stored image data, as the image data regarding the game object. Furthermore, the imaging section 32 may output image data representative of the appearance of the subject, and the object setup section 36 may set the image data outputted from the imaging section 32 as the image data regarding the game object.

Moreover, the object setup section 36 may set a value (attribute value) corresponding to the status of the subject for each of one or more parameters that determine the properties of the game object. The parameters may be data that determines the appearance or operation of the game object, an operation relative to the game object, or a response to such an operation. If, for example, the subject is identified as a living body, the object setup section 36 may set a value indicative of a living bogy as a parameter for the game object.

The display control section 38 causes the display section 40 to display an image of the game object set by the object setup section 36. Further, the display control section 38 causes the display section 40 to display the image of the game object in a manner based on game object parameter values set by the object setup section 36.

The model update section 42 receives a user's feedback on the result of identification by the body identification section 34, and updates the model data stored in the model storage section 30 in accordance with the user's feedback. Data (feedback data) to be fed back from the user may be obtained by associating the identification (ID) of the game object displayed in the game with the correct type and status of the subject (referred to as the correct information).

The model update section 42 may reflect, in the model data, the multispectral data regarding the subject corresponding to the game object (serving as the origin of the game object) and the type and status of the subject that is indicated by the correction information. For example, the model update section 42 may replace existing model data associated with the type and status of the subject, which is indicated by the correct information, with the multispectral data acquired by a current imaging operation.

An operation of the entertainment system 10 having the above-described configuration will now be described.

Figure 5:
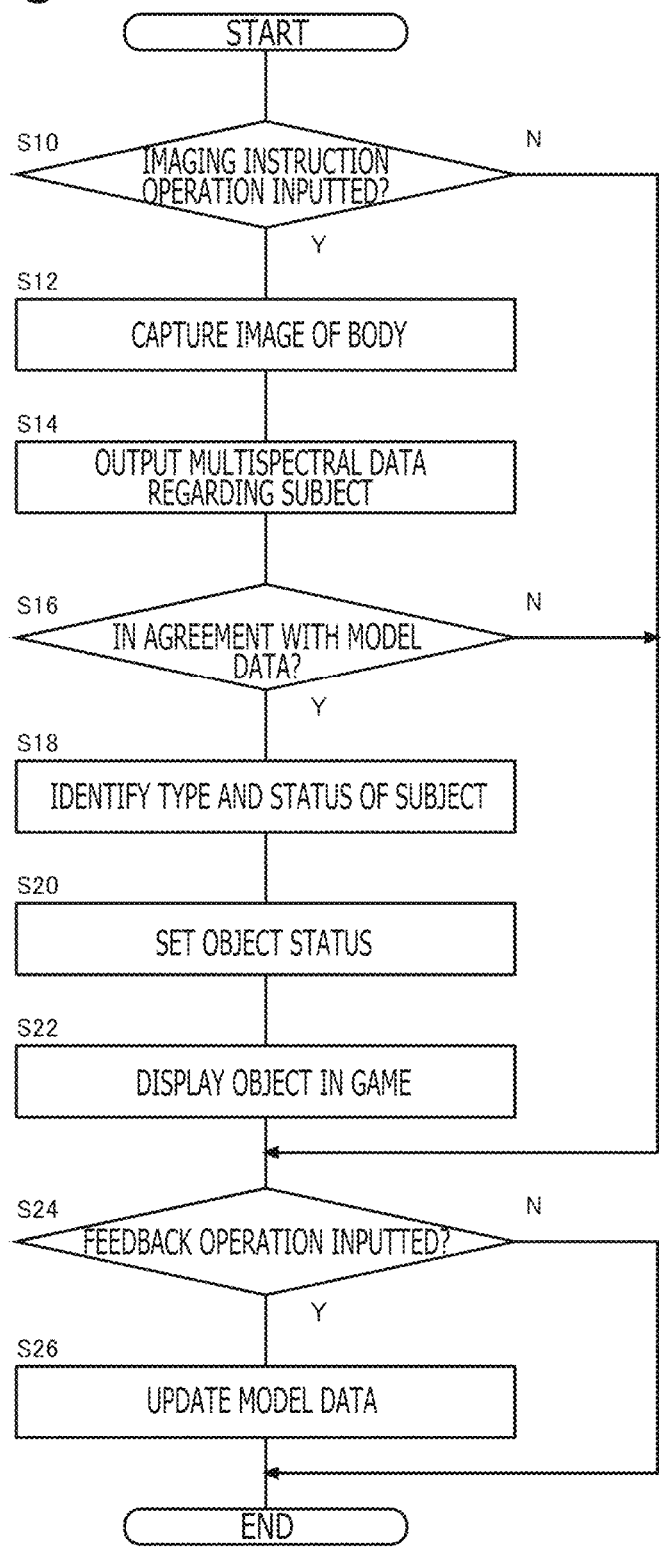
FIG. 5 is a flowchart illustrating an operation of the entertainment system depicted in FIG. 1.

FIG. 5 is a flowchart illustrating the operation of the entertainment system depicted in FIG. 1. The user uses the multispectral camera 18 to capture an image of a body to be incorporated into the game space. When the user inputs an imaging instruction operation in order to give instructions for imaging the body (Y at step S10), the multispectral camera 18 (imaging section 32) captures an image of the body in the angle of view as a subject (step S12). The multispectral camera 18 (imaging section 32) outputs multispectral data regarding the subject to the gaming device 12 as an imaging result (step S14). The gaming device 12 transmits to the server 20 a subject identification request including the multispectral data regarding the subject.

If the multispectral data regarding the subject agrees with specific model data stored in the model storage section 30 (Y at step S16), the server 20 (body identification section 34) identifies the type and status of the subject as the type and status of a body that are associated with the specific model data (step S18). The server 20 transmits data indicative of the identified type and status of the subject to the gaming device 12.

Based on the type and status of the subject that are identified by the server 20, the gaming device 12 (object setup section 36) sets image data specifying the appearance of a game object and parameter values specifying the status of the game object (step S20). The gaming device 12 (display control section 38) transmits the image data regarding the game object to the display device 16 (display section 40) and causes the display device 16 to display the game object in a displayed game (step S22). Further, the gaming device 12 (display control section 38) displays the game object in a manner based on the status (parameter values) of the game object, which is set in step S20, and allows the game to progress.

When the user inputs a feedback operation to the controller 14 (Y at step S24), the gaming device 12 receives the inputted feedback operation. The gaming device 12 transmits, to the server 20, feedback data including the ID of the game object specified by the feedback operation and the correct type and status of the subject. The server 20 (model update section 42) updates the model data in the model storage section 30 in accordance with the feedback data (step S26). If the feedback operation is not inputted (N at step S24), processing skips step S26.

If the multispectral data indicative of a subject imaging result disagrees with all model data (N at step S16), processing skips steps S18 to S22. In this instance, the server 20 may transmit, to the gaming device 12, information indicative of the inability to identify the subject, and cause the display control section 38 of the gaming device 12 to let the display section 40 display a message prompting the user to input correct information indicative of the correct type and status of the subject.

When the correct information is inputted, the gaming device 12 may transmit, to the server 20, feedback data that is obtained by associating the correct information with the multispectral data indicative of the subject imaging result, and allow the model data to be updated. For example, the server 20 may regard the multispectral data indicative of the subject imaging result as new model data and store the new model data in the model storage section 30 in association with the correct information. If the imaging instruction operation is not inputted to the multispectral camera 18 (N at step S10), no subsequent steps are performed, that is, processing skips steps S12 to S22.

The entertainment system 10 according to the first embodiment is able to provide the user with novel entertainment formed of a combination of real world and game world. For example, the entertainment system 10 is able to reflect, in a game object, the status (hotness, coldness, deterioration, etc.) of the subject as well as the appearance of a subject. That is to say, the subject in the real world can be reproduced accurately and precisely in the game world. Further, the entertainment system 10 is able to raise the level of subject reproduction in the game world in accordance with the user's feedback.

Examples of games provided by the entertainment system 10 according to the first embodiment will now be described.

As a first example, the object setup section 36 sets an image of a game character corresponding to a subject in accordance with the result of identification by the body identification section 34. The display control section 38 displays the game character in a game space.

The display control section 38 may display a game in which a life form in the real world, such as a human, an insect, an animal, or a plant, is incorporated into the game space as a game character by capturing an image of the life form with the multispectral camera 18. Further, the display control section 38 may display a game in which a game character corresponding to a life form is bred or display a game in which the game character can be replaced with another. Meanwhile, the body identification section 34 may additionally acquire depth information about the subject in accordance with an image captured by the imaging section 32 in order to identify the distance from the camera, and use the acquired depth information to identify the type and/or status of the subject.

Figure 6A:
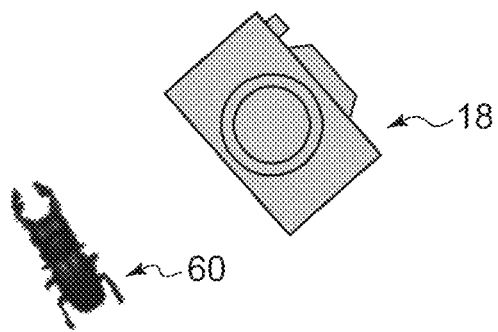
FIGS. 6A and 6B are diagrams illustrating examples of games.
Figure 6B:
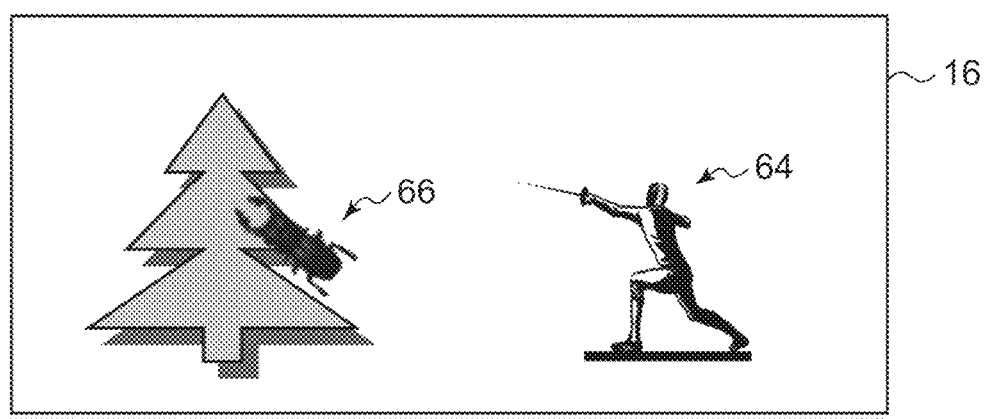

FIGS. 6A and 6B illustrate examples of games. As illustrated in FIG. 6A, the user uses the multispectral camera 18 to capture an image of a body existing in the real space (an insect 60 in FIG. 6A). The insect 60 imaged by the multispectral camera 18 is incorporated into a game space. Referring to FIG. 6B, the display device 16 displays the game space including a player character 64. A game object 66 corresponding to the insect 60 has appeared in the game space.

According the above-described game, the user can capture an image of a collected insect with the multispectral camera 18 and incorporate it into the game. Further, when the subject is identified as a living body by the body identification section 34, a game character corresponding to the subject may be displayed in the game by the display control section 38.

As a second example, when the subject is identified as a living body, the body identification section 34 further identifies the health of the subject. The object setup section 36 reflects, in the game character, the subject's health identified by the body identification section 34.

For example, the model storage section 30 may store a plurality of model data regarding each combination of the type and health of a living body serving as the subject. In accordance with the difference between the multispectral data regarding the subject and the plurality of model data, the body identification section 34 may identify the type and health of the living body serving as the subject. Further, the imaging section 32 may acquire multispectral data including light intensity in a wavelength band in which the light intensity varies depending on the subject's health. The object setup section 36 may identify the subject's health in accordance with the light intensity in the wavelength band.

The object setup section 36 may set the strength of the game character in accordance with the identified health of the subject. For example, the object setup section 36 may perform setup so that parameter values of the game character, such as the life span, physical strength, offensive power, and defensive power of the game character, increase with an increase in the level of the subject's health.

As a third example, the model storage section 30 stores a plurality of parts data, which are multispectral data regarding a plurality of parts (i.e., members) that may be included in the subject. The body identification section 34 identifies one or more parts included in the subject in accordance with the difference between the multispectral data regarding the subject and the plurality of parts data. The display control section 38 displays one or more game objects corresponding to one or more parts identified by the body identification section 34.

For example, the model storage section 30 may store a plurality of parts data regarding parts that may be included in a plastic model, for instance, of a vehicle. The plurality of parts data may be data obtained by associating the multispectral data regarding each part with attribute information about each part, such as the performance and price. The imaging section 32 may capture an image of the plastic model, and the body identification section 34 may identify one or more parts included in the plastic model in accordance with the difference between the plurality of parts data and the multispectral data regarding the plastic model to be imaged. The object setup section 36 may acquire, from the model storage section 30, the attribute information about one or more parts included in the plastic model and set the attributes (performance, price, etc.) indicated by the attribute information as the attributes of the game objects corresponding to the individual parts.

Consequently, it is possible to implement a game in which the plastic model imaged by the user appears in a virtual space while assuming the attributes of the plastic model parts. For example, a vehicle exhibiting a behavior (e.g., the way of cornering) based on the attributes of individual parts can be displayed in the game.

The present disclosure has been described based on the first embodiment. It will be understood by those skilled in the art that the first embodiment is merely illustrative, and that the combination of elements or processes may be variously modified, and further that such modifications are within the scope of the present disclosure.

A modification of the first embodiment will now be described. The entertainment system 10 (e.g., server 20) may further include a subject data storage section. The subject data storage section may store a plurality of pieces of multispectral data that are obtained by capturing an image of the same subject at different time points. Stated differently, the subject data storage section may store a plurality of pieces of multispectral data regarding the same subject that are acquired at different time points by the imaging section 32. Further, the subject data storage section may store the plurality of pieces of multispectral data regarding the same subject in association with the type of the subject that is identified by the body identification section 34.

The body identification section 34 may store chronological changes in the multispectral data regarding each of the bodies serving as subjects in association with changes in the status of each subject (e.g., improving or degrading health). The body identification section 34 may identify the status of a subject in accordance with chronological changes in a plurality of pieces of multispectral data regarding the subject that are acquired at different time points.

For example, the body identification section 34 may compare the model data in the model storage section 30 with the current multispectral data regarding a subject that is acquired by a current imaging operation in order to identify the type of the subject, and acquire previous multispectral data associated with the type of the subject from the subject data storage section. The body identification section 34 may identify the chronological changes by comparing the current multispectral data regarding the subject with the previous multispectral data. The body identification section 34 may identify the current status of the subject (e.g., degraded health) in accordance with changes in the status of the subject that are associated with chronological changes in the multispectral data.

Another modification of the first embodiment will now be described. Based on at least either the type or status of a subject that is identified by the body identification section 34, the entertainment system 10 may change an operation that the user can execute in a game with respect to a game object corresponding to the subject.

For example, the gaming device 12 may include an operation limitation storage section. The operation limitation storage section stores, in association with at least either the type or status of a subject, operation limitation information indicative of an operation that can be executed with respect to a game object corresponding to the subject. The operation limitation information may be data that defines, for example, a "throwing" operation as an executable operation when the game object is a ball. Further, when the game object is a bat, the operation limitation information may be data that defines a "swinging" operation as an executable operation, that is, defines the "throwing" operation as an inexecutable operation.

Further, the operation limitation information may be data that defines a "walking" operation and a "running" operation as an executable operation when the game object (a character in the present example) is healthy. Furthermore, when the game object is unhealthy, the operation limitation information may be data that defines a "walking" operation and a "sleeping" operation as an executable operation (defines a "running" operation as an inexecutable operation). The gaming device 12 (display control section 38) may present, as an operation menu option user-selectable for a game object, an operation that is defined by the operation limitation information as executable with respect to the game object.

Yet another modification of the first embodiment will now be described. The model data stored in the model storage section 30 includes first multispectral data, but may exclude second multispectral data. The first multispectral data is obtained when a commodity existing in the real world is directly imaged as a subject. The second multispectral data is obtained when a commodity displayed, for example, in a book or on a screen is imaged. Further, the object setup section 36 and the display control section 38 displays a game object corresponding to the subject in a game when the multispectral data regarding the subject agrees with the first multispectral data, but may refrain from displaying the game object corresponding to the subject when the multispectral data regarding the subject agrees with the second multispectral data. This makes it possible to place restrictions so that only a commodity owned by the user can be incorporated into the game.

Still another modification of the first embodiment will now be described. In the first embodiment, a body incorporated into the game (referred to as the target body) serves as a subject, and the type of status of the target body are identified based on the multispectral data regarding the target body. An alternative is to regard a different body related to the target body (e.g., the excrement of the target body) as a subject and identify the type and status of the target body in accordance with the multispectral data regarding the different body. In such an instance, the model storage section 30 may store model data that is obtained by associating the multispectral data regarding the different body with the type and status of the target body.

An additional modification of the first embodiment will now be described. The functional blocks depicted in FIG. 2 may be disposed between a plurality of devices in a manner different from the first embodiment. For example, the gaming device 12 may have the functions incorporated in the server 20 according to the first embodiment. That is to say, the gaming device 12 may additionally include the model storage section 30, the body identification section 34, and the model update section 42. In such an instance, a CPU in the gaming device 12 may execute an application program that incorporates the functions of the model storage section 30, body identification section 34, object setup section 36, display control section 38, and model update section 42.

Further, the entertainment system 10 may be implemented by allowing an information terminal (e.g., a smartphone or a tablet computer) having the functions of the imaging section 32, object setup section 36, display control section 38, and display section 40 to coordinate with the server 20. The information terminal may include a multispectral camera corresponding to the imaging section 32 and a touch screen corresponding to the display section 40. In this instance, a CPU in the information terminal may execute an application program having the functions of the object setup section 36 and display control section 38.

A yet additional modification of the first embodiment will now be described. The entertainment system 10 may identify the type of a subject in accordance with the multispectral data regarding the subject, but need not identify the status of the subject. In this instance, the model storage section 30 may store a plurality of predefined model data corresponding to a plurality of different bodies serving as a subject. The body identification section 34 may identify the type of the subject by comparing the multispectral data regarding the subject with the plurality of model data. The object setup section 36 may set data regarding a game object in accordance with the type of the subject.

In the above embodiment, too, the multispectral data regarding the subject can be used to accurately identify the type of the subject and cause a game object obtained by faithfully reproducing the subject to appear in a game. The body identification section 34 may determine the status of the subject as a specific state in accordance with the type of the subject or select one of a plurality of candidate states as the status of the subject in accordance with a predetermined algorithm (or in a random manner).

Second Embodiment

A second embodiment of the present disclosure proposes an information processing system that executes a predetermined action with respect to a subject in accordance with both the type and status of the subject that are identified based on the multispectral data regarding the subject. In the following description, elements identical with or corresponding to those included in the entertainment system 10 according to the first embodiment are designated by the same reference numerals as the corresponding elements, and the elements already described in conjunction with the first embodiment will not be redundantly described.

Figure 7:
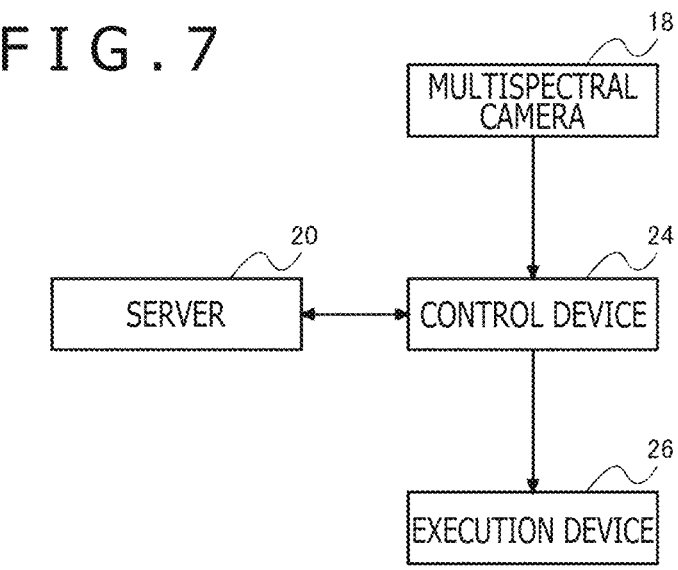
FIG. 7 is a diagram illustrating a configuration of an information processing system according to a second embodiment of the present disclosure.

FIG. 7 illustrates a configuration of the information processing system 22 according to the second embodiment. The information processing system 22 according to the second embodiment includes a multispectral camera 18, a server 20, a control device 24, and an execution device 26.

The execution device 26 executes a predetermined action with respect to a subject imaged by the multispectral camera 18 or acts on the subject in a predetermined manner. The control device 24 is an information processing device that corresponds to the gaming device 12 according to the first embodiment and controls the operation of the execution device 26 in accordance with the result of identification by the body identification section 34.

Figure 8:
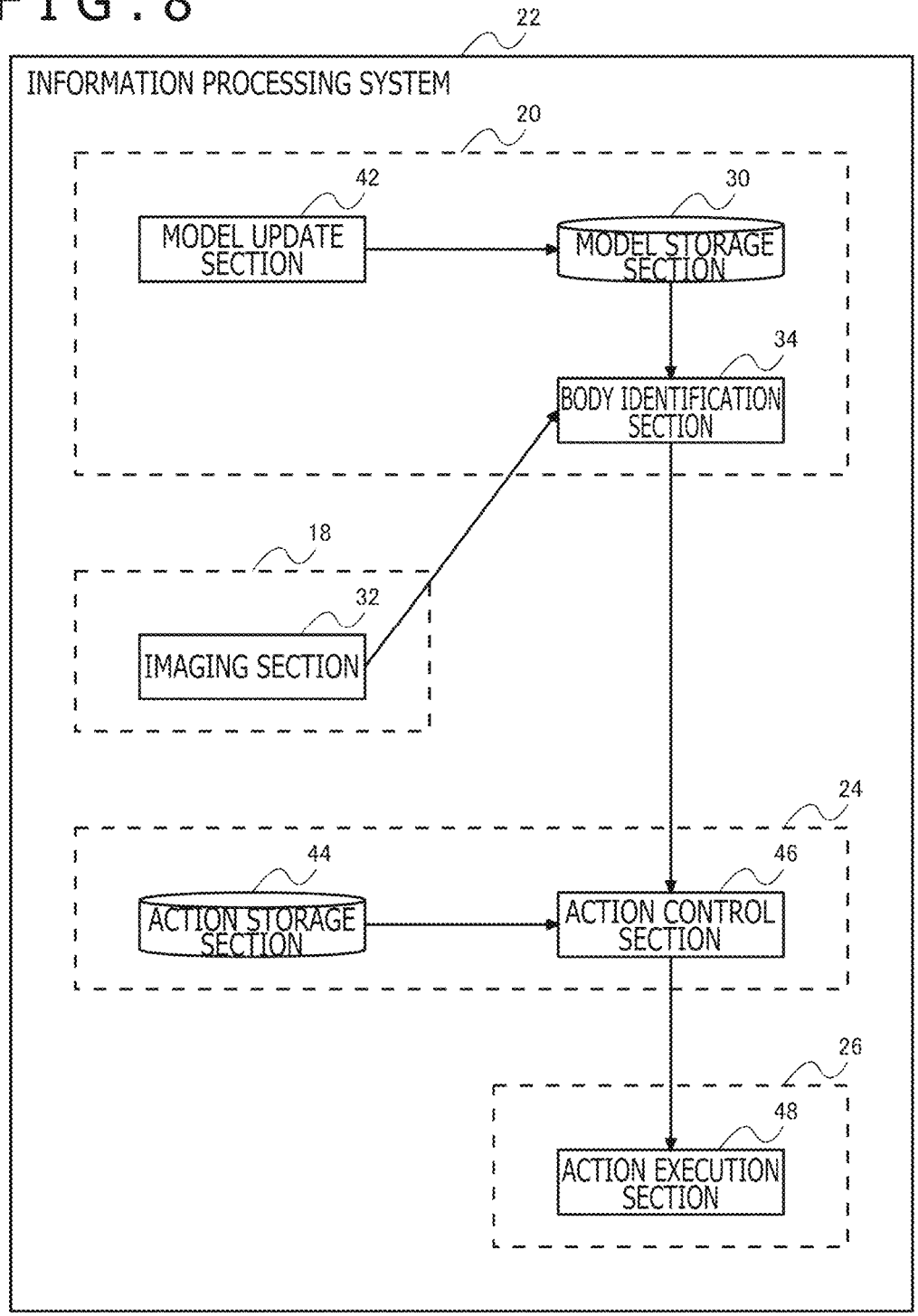
FIG. 8 is a block diagram illustrating a functional configuration of the information processing system depicted in FIG. 7.

FIG. 8 is a block diagram illustrating a functional configuration of the information processing system 22 depicted in FIG. 7. The model storage section 30, imaging section 32, body identification section 34, and model update section 42 depicted in FIG. 7 are identical with those in the first embodiment. The information processing system 22 according to the second embodiment includes an action storage section 44, an action control section 46, and an action execution section 48. In the present embodiment, the control device 24 provides the functions of the action storage section 44 and action control section 46, and the execution device 26 provides the functions of the action execution section 48.

The action storage section 44, the action control section 46, and the action execution section 48 coordinate with each other to function as an action section that acts on the subject. For each combination of the type and status of the subject, the action storage section 44 stores one or more records associated with actions to be executed with respect to the subject. Stated differently, the action storage section 44 stores one or more records that are obtained by associating a combination of the type and status of the subject with an action to be executed with respect to the subject.

The action execution section 48 executes a predetermined action with respect to the subject. The action execution section 48 includes an actuator that executes a predetermined action. The predetermined action may be at least one of cutting, joining, contacting, heating, cooling, and vibrating.

The action control section 46 references the action storage section 44 to identify an action associated with a combination of the type and status of the subject that is identified by the body identification section 34. The action control section 46 controls the action execution section 48 in such a manner as to execute the identified action, and transmits, for example, a signal dictating the execution of the identified action to the action execution section 48.

The execution device 26 according to the second embodiment may be, for example, a haircutter (hair cutting device). The action storage section 44 may store information that is obtained by associating a combination of the type of a subject, that is, the hair of a person's head, and the status of the subject, that is, "white" or "damaged" with a "cutting" action. The imaging section 32 may capture an image of each strand of hair of the user. When the body identification section 34 identifies the status of the subject as "white" or "damaged" hair of a person's head, the action control section 46 may transmit to the action execution section 48 a signal dictating the cutting of the hair of the person's head. In response to the signal received from the action control section 46, the action execution section 48 may cut the white or damaged hair.

Figure 9:
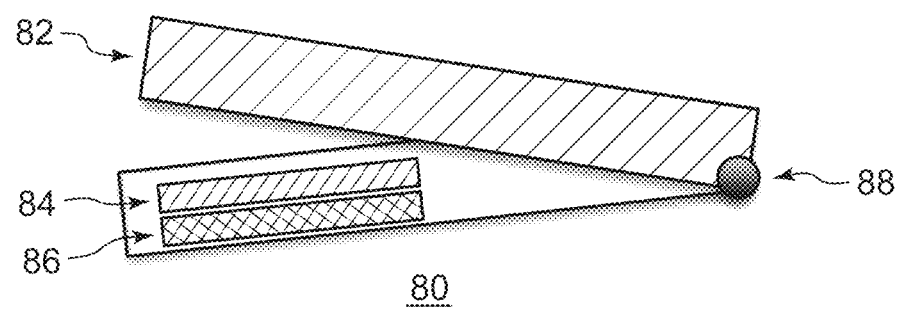
FIG. 9 is a diagram illustrating an example of a haircutter.

FIG. 9 illustrates an example of the above-mentioned haircutter. The haircutter 80 includes a housing 82, a cutter section 84, an imaging section 86, and a movable section 88. The cutter section 84 and the imaging section 86 are removed from the housing 82 when the movable section 88 pivots. The imaging section 86 depicted in FIG. 9 corresponds to the imaging section 32 according to the second embodiment. The imaging section 86 captures an image of each strand of hair of the user. The cutter section 84 cuts the hair targeted for imaging when it is white or damaged.

Based on both the type and status of a subject imaged by the user, the information processing system 22 according to the second embodiment is able to automatically execute an action suitable for the subject.

The present disclosure has been described based on the second embodiment. It will be understood by those skilled in the art that the second embodiment is merely illustrative, and that the combination of elements or processes may be variously modified, and further that such modifications are within the scope of the present disclosure.

As a modification of the second embodiment, the functional blocks depicted in FIG. 5 may be disposed between a plurality of devices in a manner different from the second embodiment. Further, the functional blocks depicted in FIG. 5 may be included in a single device (e.g., execution device 26).

As another modification of the second embodiment, the information processing system 22 may execute a predetermined action with respect to a subject in accordance with the type of the subject that is identified based on the multispectral data regarding the subject. In such an instance, the body identification section 34 identifies the type of the subject in accordance with the multispectral data regarding the subject, but does not need to identify the status of the subject. The action control section 46 may cause the action execution section 48 to execute an action with respect to the subject in accordance with the type of the subject. The body identification section 34 may determine the status of the subject as a specific state in accordance with the type of the subject or select one of a plurality of candidate states as the status of the subject in accordance with a predetermined algorithm (or in a random manner).

Third Embodiment

A third embodiment of the present disclosure proposes an entertainment system that varies the status of a predetermined device (a glove device in the present embodiment) in contact with a user's body in accordance with both the type and status of the subject that are identified based on the multispectral data regarding the subject. In the following description, elements identical with or corresponding to those included in the entertainment system 10 according to the first embodiment are designated by the same reference numerals as the corresponding elements. The elements already described in conjunction with the first embodiment will not be redundantly described.

Figure 10:
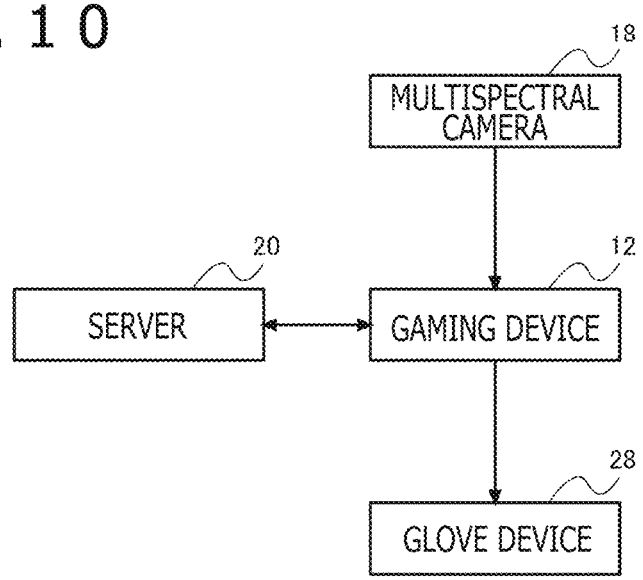
FIG. 10 is a diagram illustrating a configuration of the entertainment system according to a third embodiment of the present disclosure.

FIG. 10 illustrates a configuration of the entertainment system 10 according to the third embodiment. The entertainment system 10 according to the third embodiment includes the gaming device 12, the multispectral camera 18, the server 20, and the glove device 28.

The glove device 28, which is attached to a hand of the user, gives a stimulus to the hand of the user under the control of the gaming device 12. The glove device 28, which functions as a tactile sensation reproduction device, gives, for example, a hot, cold, or electric stimulus to the hand of the user. The gaming device 12 executes a game that gives an appropriate stimulus to the user in accordance with the type and status of the subject.

Figure 11:
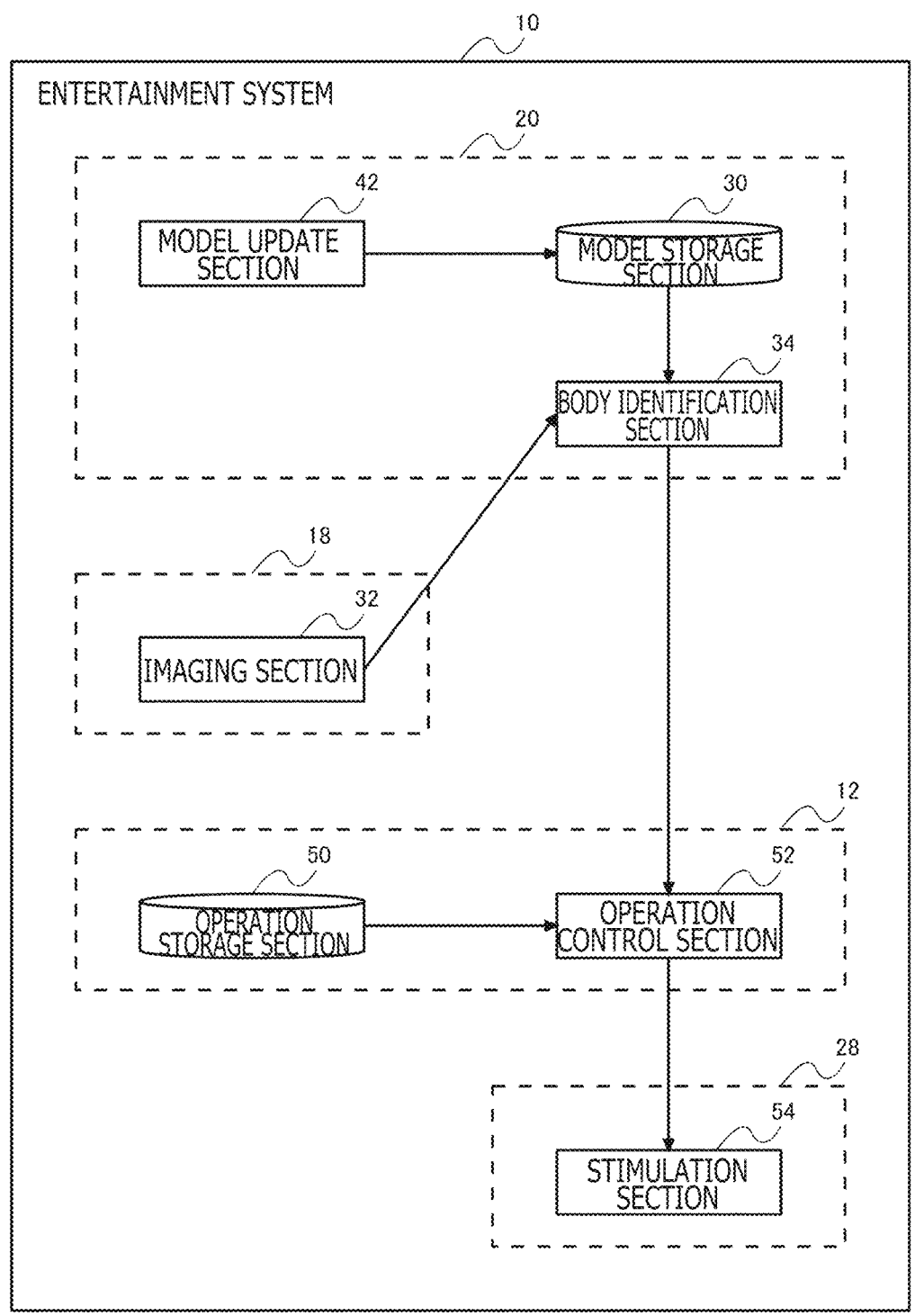
FIG. 11 is a block diagram illustrating a functional configuration of the entertainment system depicted in FIG. 10.

FIG. 11 is a block diagram illustrating a functional configuration of the entertainment system 10 depicted in FIG. 10. The model storage section 30, imaging section 32, body identification section 34, and model update section 42 depicted in FIG. 11 are identical with the corresponding elements in the first embodiment. The entertainment system 10 according to the third embodiment includes an operation storage section 50, an operation control section 52, and a stimulation section 54. In the present embodiment, the gaming device 12 provides the functions of the operation storage section 50 and operation control section 52, and the glove device 28 provides the functions of the stimulation section 54.

For each combination of the type and status of the subject, the operation storage section 50 stores one or more records associated with the status of the stimulation section 54. Stated differently, the operation storage section 50 stores one or more records that are obtained by associating a combination of the type and status of the subject with the status of the stimulation section 54. In the present embodiment, the status of the stimulation section 54 is an operating mode of the stimulation section 54, that is, the type of stimulus that the stimulation section 54 gives to the user.

The stimulation section 54 gives a predetermined stimulus to the user. In the present embodiment, the stimulation section 54 gives, for example, a hot, cold, or electric stimulus to the hand of the user. The stimulation section 54 may be implemented by a well-known VR glove. The operation control section 52 references the operation storage section 50 to identify the status of the stimulation section 54 that is associated with a combination of the type and status of the subject, which are identified by the body identification section 34. The operation control section 52 controls the stimulation section 54 in such a manner as to obtain the identified status, and transmits to the stimulation section 54 a signal dictating, for example, a change to the identified status.

If, for example, the body identification section 34 identifies the type of the subject as coffee in a cup and the status of the subject as hot (hot coffee), the operation control section 52 may exercise control so that the stimulation section 54 changes from a normal state to a hot state. Meanwhile, if the body identification section 34 identifies the type of the subject as coffee in a cup and the status of the subject as cold (iced coffee), the operation control section 52 may exercise control so that the stimulation section 54 changes from a normal state to a cool air emission state.

Figure 12:
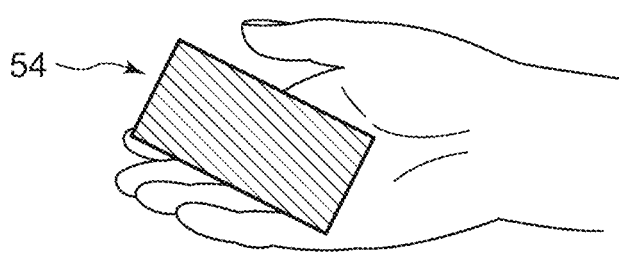
FIG. 12 is a diagram illustrating another example of a stimulation section.

FIG. 12 illustrates another example of the stimulation section 54. The stimulation section 54 depicted in FIG. 12 is a device that includes a thermal conduction element and transmits heat or cold to a hand of the user. The user may wear on his/her head an eyeglass-type imaging section 32 (multispectral camera 18) capturing an image of a space positioned in the line-of-sight direction of the user or wear a head-mounted display including such an imaging section 32. The gaming device 12 (not depicted) may be connected to the stimulation section 54 in order to control the stimulation section 54 based on the type and/or status of a body imaged by the imaging section 32 in such a manner as to give heat or cold to the user based on the type and/or status of the imaging target body. If, for example, a body positioned in the line-of-sight direction of the user is identified as a hot body while a VR, AR, or mixed reality (MR) image is being displayed, heat may be transmitted to the user through the thermal conduction element in the stimulation section 54.

Based on both the type and status of a subject imaged by the user, the entertainment system 10 according to the third embodiment is able to stimulate the user in a manner based on the subject and provide novel entertainment to the user.

The present disclosure has been described based on the third embodiment. It will be understood by those skilled in the art that the third embodiment is merely illustrative, and that the combination of elements or processes may be variously modified, and further that such modifications are within the scope of the present disclosure.

As a modification of the third embodiment, the entertainment system 10 may vary the status of a predetermined device in contact with a user's body in accordance with the type of the subject that is identified based on the multispectral data regarding the subject. In such an instance, the body identification section 34 identifies the type of the subject in accordance with the multispectral data regarding the subject, but need not identify the status of the subject. The operation control section 52 may vary the status of the stimulation section 54 in contact with the user's body in accordance with the type of the subject. The body identification section 34 may determine the status of the subject as a specific state in accordance with the type of the subject or select one of a plurality of candidate states as the status of the subject in accordance with a predetermined algorithm (including a randomized algorithm).

Combinations of the above-described embodiments and variations are also effective as embodiments of the present disclosure. Embodiments created by such combinations provide advantages of the combinations of the embodiments and variations. Further, it will be understood by those skilled in the art that functions to be exercised by constituent features defined by the appended claims are implemented solely by one of the elements described in conjunction with the embodiments and modifications or implemented coordinately by such elements.

The present disclosure contains subject matter related to that disclosed in Japanese Priority Patent Application JP 2017-201228 filed in the Japan Patent Office on Oct. 17, 2017, the entire content of which is hereby incorporated by reference.

What is claimed is:

1. An information processing system comprising:
an imaging section configured to capture an image of a user-designated body and output multispectral data regarding a subject, the multispectral data indicating light intensity in four or more wavelength bands;
an identification section configured to identify the type of the subject in accordance with the multispectral data regarding the subject;
a setup section configured to set, based on the type of the subject, an object corresponding to the subject appearing in a game; and
a display control section configured to cause the object to be displayed in the game in a manner based on the type of the subject.

2. The information processing system according to claim 1, further comprising:
a first storage section configured to store a plurality of pieces of multispectral data corresponding to a plurality of bodies,
wherein the identification section identifies the type of the subject in accordance with the difference between the multispectral data regarding the subject and a plurality of pieces of multispectral data stored in the first storage section.

3. The information processing system according to claim 2, further comprising:
an update section configured to receive a user's feedback on the result of identification by the identification section, and update data stored in the first storage section in accordance with the user's feedback.

4. The information processing system according to claim 1,
wherein the identification section further identifies the status of the subject, and
the setup section further sets the status of the object in the game in accordance with the status of the subject.

5. The information processing system according to claim 4, further comprising:
a first storage section configured to store a plurality of pieces of multispectral data regarding each combination of the type and status of a body,
wherein the identification section identifies both the type and status of the subject in accordance with the difference between the multispectral data regarding the subject and a plurality of pieces of multispectral data stored in the first storage section.

6. The information processing system according to claim 4, further comprising:
a second storage section configured to store a plurality of pieces of multispectral data regarding the subject, the plurality of pieces of multispectral data being acquired at different time points by the imaging section,
wherein the identification section identifies the status of the subject in accordance with chronological changes in the plurality of pieces of multispectral data.

7. The information processing system according to claim 4, wherein the identification section identifies the status of the subject by determining whether or not the subject is a living body.

8. The information processing system according to claim 7, wherein, further based on the presence of motion of the subject that is indicated by the result of imaging by the imaging section, the identification section identifies whether or not the subject is a living body.

9. The information processing system according to claim 7,
wherein the display control section causes a character to be displayed, corresponding to the subject,
the identification section identifies the health of the subject when the subject is identified as a living body, and
the setup section reflects, in the character, the health identified by the identification section.

10. The information processing system according to claim 2,
wherein the first storage section stores parts data, the parts data being multispectral data regarding each of a plurality of parts includible in the subject,
the identification section identifies one or more parts including the subject in accordance with the difference between the multispectral data regarding the subject and the parts data stored in the first storage section, and the display control section causes one or more objects to be displayed, corresponding to the one or more parts identified by the identification section.

11. The information processing system according to claim 1, wherein, based on at least either the type or status of the subject that is identified by the identification section, a user-executable operation on the object varies in the game.

12. An information processing system comprising:
an imaging section configured to capture an image of a user-designated body and output multispectral data regarding a subject, the multispectral data indicating light intensity in four or more wavelength bands;
an identification section configured to identify the type of the subject in accordance with the multispectral data regarding the subject; and
an action section configured to execute a predetermined action with respect to the subject in accordance with the type of the subject that is identified by the identification section.

13. An information processing system comprising:
an imaging section configured to capture an image of a user-designated body and output multispectral data regarding a subject, the multispectral data indicating light intensity in four or more wavelength bands;
an identification section configured to identify the type of the subject in accordance with the multispectral data regarding the subject; and
a control section configured to vary the status of a predetermined device in contact with a user's body in accordance with the type of the subject that is identified by the identification section.

14. An information processing method for an information processing system comprising:
capturing an image of a user-designated body and outputting multispectral data regarding a subject, the multispectral data indicating light intensity in four or more wavelength bands;
identifying the type of the subject in accordance with the multispectral data regarding the subject;
setting, based on the type of the subject, an object corresponding to the subject appearing in a game; and
causing the object in the game to be displayed in a manner based on the type of the subject.

* * * * *